Nov. 11, 1969    C. F. MADDOX    3,477,307
COLLAPSIBLE STEERING COLUMN
Filed Dec. 18, 1967    3 Sheets-Sheet 1
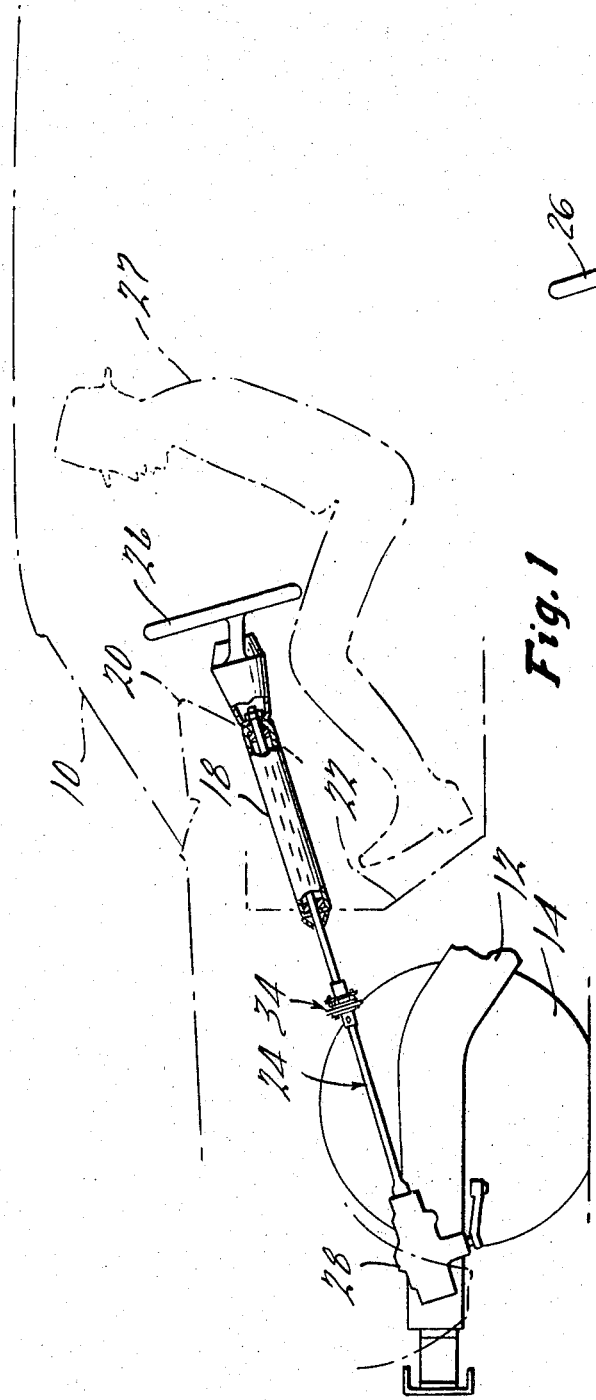
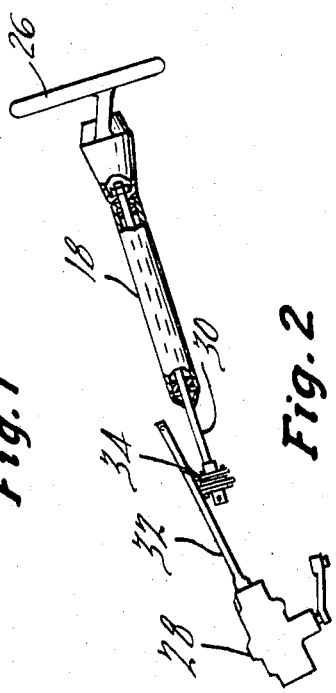
INVENTOR.
Charles F. Maddox
BY John R. Faulkner
Clifford T. Sadler
ATTORNEYS.

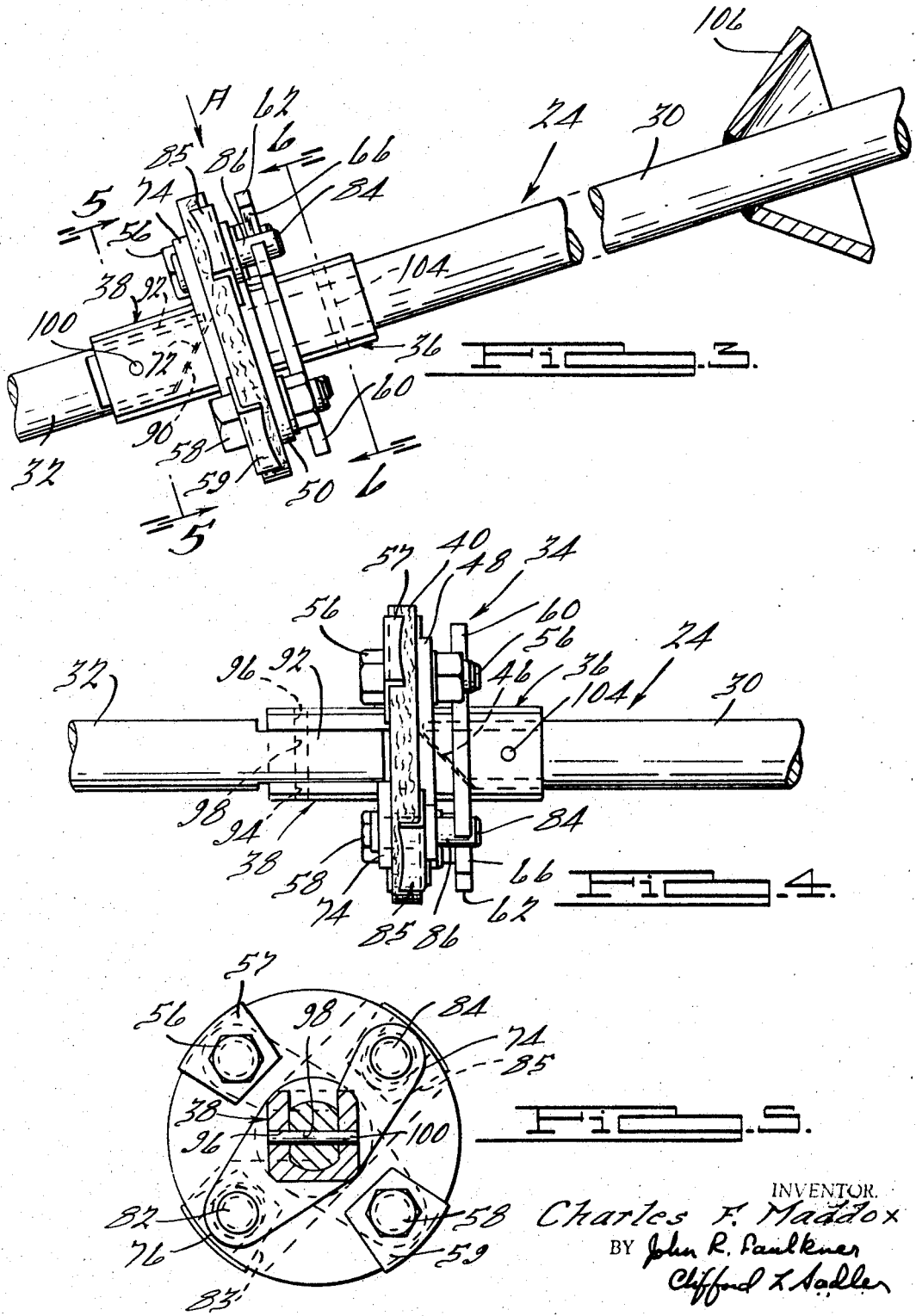

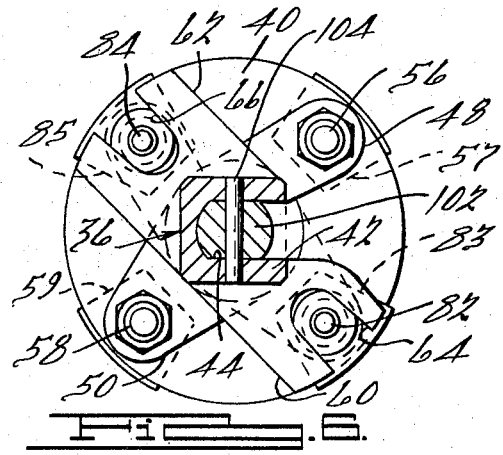
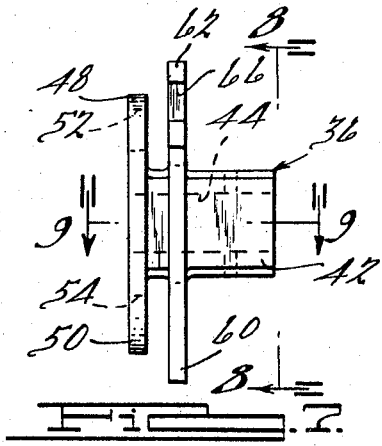
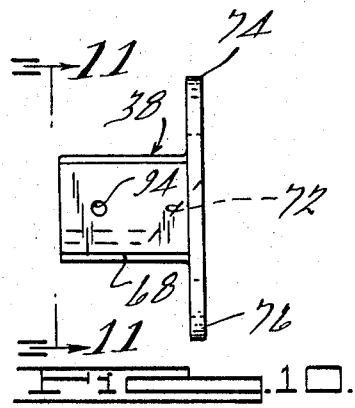
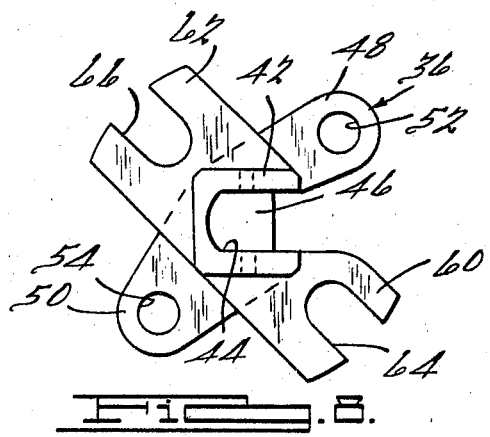
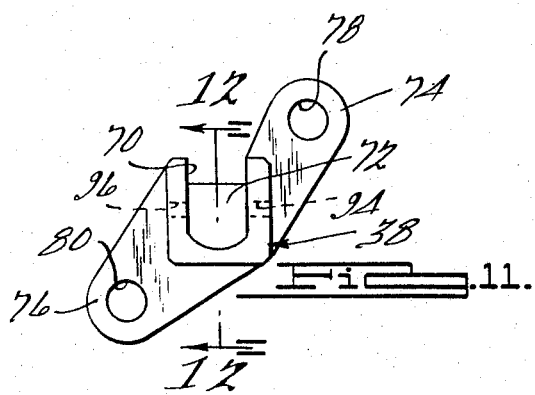
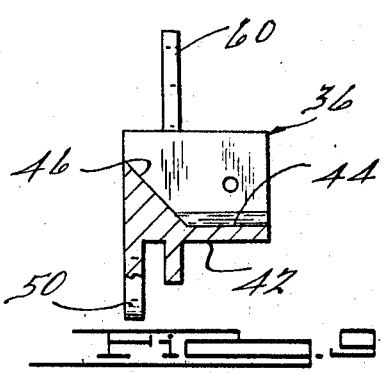
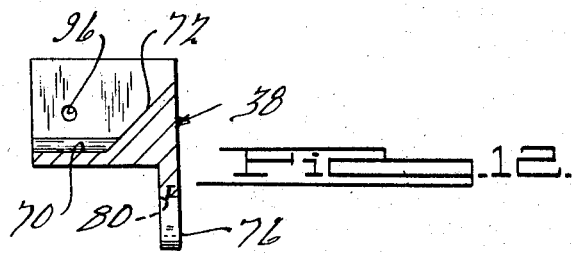
INVENTOR.
Charles F. Maddox

United States Patent Office 3,477,307
Patented Nov. 11, 1969

3,477,307
COLLAPSIBLE STEERING COLUMN
Charles F. Maddox, Livonia, Mich., assignor to Ford Motor Company, Dearborn, Mich., a corporation of Delaware
Filed Dec. 18, 1967, Ser. No. 691,409
Int. Cl. B62d 1/16; B60k 27/00, 33/00
U.S. Cl. 74—492                                 9 Claims

ABSTRACT OF THE DISCLOSURE

A steering system for a motor vehicle having a two-piece steering shaft with one end connected to the steering gear and the other end connected to the steering wheel. The two shaft pieces are connected by a flexible coupling and each shaft is joined to the coupling by a frangible member. In the event the steering gear is displaced rearwardly, the frangible members will break and the shaft pieces will be disconnected thereby preventing the upper shaft piece from also being displaced rearwardly.

BACKGROUND OF THE INVENTION

This invention relates to a motor vehicle steering system and more particularly, it relates to a steering system in which the steering shaft is constructed to collapse under an axial load.

Collapsible steering shafts for motor vehicles are well known and are used extensively on current model automobiles. These steering columns generally employ telescopic parts which allow only a limited amount of axial deformation.

This invention permits a large amount of axial travel of the steering gear without causing a corresponding amount of displacement of the rearward portion of the steering shaft.

BRIEF SUMMARY OF THE INVENTION

In the presently preferred embodiment of this invention, a motor vehicle is provided with a steering system having a two-piece steering shaft. The upper piece is connected to the steering wheel and the lower piece is connected to the steering gear. The two shaft pieces are interconnected by a flexible coupling. Each shaft piece is connected to the coupling by frangible element and, in addition, has a slanted end. The coupling is located forwardly of the firewall of the vehicle.

If the steering gear is displaced rearwardly, an axial load will be exerted on the two shaft pieces. When that load exceeds a pre-set minimum, the frangible elements will break causing the shaft pieces to be disconnected from the coupling. This structure permits the steering gear to move rearwardly without exerting such an axial load on the upper steering shaft section as might force the steering wheel and shaft rearwardly. The slanted ends cause the shafts to be radially displaced in the event of axial movement.

BRIEF DESCRIPTION OF THE DRAWINGS

The many objects and advantages of a steering system constructed in accordance with the present invention will become apparent upon consideration of the following description and the accompanying drawings, in which:

FIGURE 1 is a side elevational view, partly in section, of a motor vehicle incorporating a steering system of this invention;

FIGURE 2 is a side elevational view of the structure illustrated in FIGURE 1 with the various elements in their displaced position;

FIGURE 3 is an enlarged elevational view of the steering shaft and the interconnecting flexible coupling between the shaft pieces;

FIGURE 4 is a top plan view of the coupling shown in FIGURE 3 and taken in the direction of arrow A;

FIGURE 5 is a sectional view of the flexible coupling taken along section lines 5—5 of FIGURE 3;

FIGURE 6 is a sectional view taken along section lines 6—6 of FIGURE 3;

FIGURE 7 is a side elevational view of one of the elements of the couplings of FIGURE 3;

FIGURE 8 is an end view of the element shown in FIGURE 7 taken in the direction of arrows 8—8;

FIGURE 9 is a sectional view of the element of FIGURE 7 taken along section lines 9—9 of that figure;

FIGURE 10 is a side elevational view of one of the other elements of the coupling of FIGURE 3;

FIGURE 11 is an end of the element shown in FIGURE 10 taken in the direction of arrows 11—11; and FIGURE 12 is a sectional view of the element of FIGURE 10 taken along section lines 12—12 of that figure.

DETAILED DESCRIPTION OF THE INVENTION

Referring now to the drawings for a detailed description of this invention, wherein its presently preferred embodiment is illustrated, FIGURE 1 discloses a portion of a motor vehicle body 10 outlined in dot-dash lines. The body 10 is mounted upon a reinforcing chassis frame 12. The chassis frame, in turn, is supported on the ground by road wheels 14.

A steering column 18 is connected to the instrument panel 20 at its upper end and to the firewall 22 at its lower end. The column 18 rotatably supports a steering shaft assembly 24. A steering wheel 26 is connected to the upper end of the shaft assembly 24 in a position convenient to the vehicle operator 27. The lower end of the shaft assembly 24 is joined to the steering gear 28. The gear 28 is mounted on the frame 12 and is constructed to be connected to the steering linkage for the front wheels 16.

The steering shaft assembly 24 is comprised of three major components, namely, an upper shaft piece 30, a lower shaft piece 32 and a flexible coupling assembly 34 that interconnects the shaft pieces 30 and 32. The lower shaft piece 32 is connected to the steering gear 28 and the coupling 34 while the upper shaft piece 30 is connected to the steering wheel 26 and coupling 34.

The flexible coupling 34 has three principle components: an upper coupling element 36, a lower coupling element 38 and an intermediate flexible member 40. The intermediate flexible member 40 is of a generally disc shape. It is molded from rubber and has an inner fabric reinforcing layer.

The upper coupling element 36 is shown in detail in FIGURES 7, 8 and 9. It includes a body portion 42 having a four-sided cavity 44. The cavity 44 is defined by three side walls that combine in a generally U-shape as seen in cross section (FIGURES 6 and 8) and a sloping end wall 46. One side of the cavity 44 is open as seen in FIGURE 8.

A pair of oppositely directed connecting arms 48 and 50 extend from the body portion 42 of the coupling element 36. The arms 48 and 50 are perforated at 52 and 54 to receive bolt assemblies 56 and 58 for attachment of the connecting element 36 to the intermediate flexible member 40. Keystone shaped washers 57 and 59 are positioned under the heads of the bolts 56 and 58 in engagement with the member 40. A pair of aligning arms 60 and 62 also extend from the body portion 42 of the element 36. The arms 60 and 62 extend at a 90° angle to the direction of the connecting arms 48 and 50. The aligning arms 60 and 62 are provided with slots 64 and 66 which serve a function that will be described later.

The lower connecting element 38 of the flexible coupling 34 is illustrated in FIGURES 10, 11 and 12. The element 38 has a body portion 68 that is similar in configuration to the body portion 42 of element 36. The body portion 68 has a cavity 70 with three side walls and a sloping end wall 72. The three side walls form a U-shaped cross sectional configuration as seen in FIGURES 5 and 11 which opens upwardly. The coupling element 38 has a pair of oppositely extending connecting arms 74 and 76 similar in configuration to the arms 48 and 50 of coupling element 30. The arms 74 and 76 are provided with holes 78 and 80 through which special rivets 82 and 84 extend.

The rivets 82, 84 have shank portions, such as shank 86 of rivet 84, that extend through the intermediate flexible member 40 into the slots 66, 64 of element 36. Rivets 82 and 84 secure the intermediate flexible member 40 to the connecting arms 74 and 76. Keystone shaped washers 83 and 85 are fitted between the heads of the rivets 82 and 84 and the flexible member 40.

The lower shaft section 32 has its upper end 92 fitted into the recess 70 of coupling element 38. The end 92 is provided with a sloping end face 90 that matches the slope of the surface 72. The sides of the shaft end 92 are ground to form flat surfaces to permit the end 92 to be located within the recess 70. A pair of holes 94 and 96 are drilled in the side walls of recess 70 and are located in alignment with a hole 98 drilled on the end 92 of the shaft section 32.

Shear pin means 100 is positioned through the holes 94, 96, 98 to secure the shaft section 32 to the element 38 of the coupling 34. The shear pin means 100 may comprise a metal pin or may comprise a plastic pin that is molded in position. In the case of a plastic pin installation, the pin 100 would be injection molded into position with plastic also being injected into any voids between the shaft end 92 and the element 38 of the flexible coupling 34. The injection molding of plastic will eliminate relative movement between the components which could cause objectionable noise and vibration.

The upper shaft section 30 is connected to the element 36 of the coupling 34. The connection of the shaft 30 with the element 36 employs a construction similar to the connection between the end 92 of shaft 32 and the coupling element 38. The end 102 of the shaft 30 has a sloping end face and parallel machined side surfaces so that it may be fitted within the recess 44. A shear pin 104 holds it in position. As explained previously, the shear pin 104 may be a metal pin or it may be a plastic pin formed by an injection molding operation. The sloping end surface of the shaft 30 complements the sloping surface 46 of the recess 44.

OPERATION

The foregoing construction provides a steering column having an upper shaft portion 30 that is secured to a flexible coupling element 36 which, in turn, is connected to an intermediate flexible element 40. Flexible element 40 is connected to coupling element 38 and it, in turn, is joined to the lower steering shaft section 32. Thus, the shaft pieces 30 and 32 are joined by the flexible coupling 34 to provide a driving connection between the steering wheel 26 and the steering gear 28. The intermediate flexible element 40 is interposed between the shaft sections 30 and 32 to eliminate the transmission of noise and vibration from the steering gear to the steering wheel. In addition, the flexible element 40 permits the accommodation of any minor misalignment between the shaft sections 30 and 32 that might result from manufacturing tolerances.

The extending shanks, such as shank 86, of rivets 82 and 84 are constructed to engage the edges of the slots 66 and 64, respectively, when heavy torque is placed upon the joint 34. This arrangement provides a direct mechanical driving connection and limits the torque which the flexible member 40 must carry to only light loads.

Rearward movement of the gear 28 will exert an axial load on the steering shaft assembly 24 tending to force it rearwardly.

If the forces tending to displace the shaft assembly 24 are above a preset minimum value, the axial load on the coupling 34 between the shaft sections 30 and 32 will cause the shear pins 100 and 104 to fracture. In such an event, the sloping end faces of the shafts 30 and 32 will engage the sloping surfaces 46 and 72 of the coupling elements 36 and 38. The shaft ends will then be displaced radially in conjunction with their relative axial movement. The ultimate result is that the shaft sections 30 and 32 will become disengaged from the flexible coupling 34 and it will no longer be possible for rearward movement of the gear 28 to exert an axial load on the upper shaft section 30 by means of the lower shaft section 32.

A reaction ring 106 is welded to the upper end of the shaft section 30 and is constructed to engage a stationary portion of the steering column 18. The reaction ring 106 prevents the shaft 30 from being forced rearwardly.

It is readily apparent that with this structure, the steering gear 28 and the lower shaft section 32 of the shaft assembly 24 may be forced rearwardly without causing a corresponding displacement of the steering shaft.

The foregoing description presents the presently preferred embodiment of this invention. Modifications and alternations may occur to those skilled in the art that will come within the scope and spirit of the invention.

I claim:

1. A steering shaft assembly for a motor vehicle constructed to be connected to a steering wheel at one end and to a steering gear at its other end, said shaft assembly comprising a first steering shaft piece, a second steering shaft piece and a flexible coupling interconnecting said pieces and forming a driving connection therebetween, said flexible coupling having a first coupling element, a second coupling element and an intermediate flexible member connected to said first and second coupling elements, said first and second coupling elements each having an open sided socket constructed to receive said first and second shaft pieces respectively, first shear pin means connecting said first coupling element to said first shaft piece, second shear pin means connecting said second shaft piece to said second coupling element, said shear pin means being constructed to fracture when a force is exerted thereon and thereby permitting said shaft pieces to become displaced laterally from said flexible coupling and from each other.

2. A steering shaft assembly for a motor vehicle constructed to be connected to a steering wheel at one end and to a steering gear at its other end, said shaft assembly comprising a first steering shaft piece, a second steering shaft piece and a coupling interconnecting said pieces and forming a driving connection therebetween, said coupling having a recess constructed to receive the end of said first shaft piece, said recess being open on one side thereof, said coupling having a sloping surface at the end of said recess, said first shaft piece having a sloping end surface complementing the sloping surface of said recess, shear pin means connecting said coupling to said first shaft piece, said shear pin means being constructed to fracture when a force is exerted thereon and thereby permitting said first shaft piece to become displaced from said coupling.

3. A steering shaft assembly according to claim 2 and including:

said shear pin means being formed of plastic material injected under heat and pressure between said first shaft piece and said coupling.

4. A steering shaft assembly according to claim 2 and including:
  reaction means secured to said shaft assembly being constructed to engage a stationary support structure.

5. A steering shaft assembly according to claim 2 and including:
  said coupling having a first coupling element, a second coupling element and an intermediate flexible member connected to said first and second elements, said first shaft piece being connected to said first coupling element, second shear pin means connecting said second shaft piece to said second coupling element, both of said shear pin means being constructed to fracture when an axial force is exerted on one of said shaft pieces.

6. A steering shaft assembly according to claim 2 and including:
  said coupling having a first coupling element, a second coupling element and an intermediate flexible member connected to said first and second elements, said first shaft piece being connected to said first coupling element, second shear pin means connecting said second shaft piece to said second coupling element, reaction means secured to said shaft assembly between said coupling and said one end of said shaft assembly, said reaction means being constructed to engage a stationary support structure, both of said shear pin means being constructed to fracture when an axial force is exerted on one of said shaft pieces.

7. A steering shaft assembly according to claim 2 and including:
  said coupling having a first coupling element, a second coupling element and an intermediate flexible member connected to said first and second elements, said first shaft piece being connected to said first coupling element, a recess formed in said second coupling element, said just mentioned recess having a sloping end wall and one open side, said second shaft piece being constructed to fit into said recess of said second coupling element and having a sloping end surface constructed to complement the sloping surface of said recess, second shear pin means connecting said second shaft piece to said second coupling element, reaction means secured to said shaft assembly between said coupling and said one end of said shaft assembly, said reaction means being constructed to engage a stationary support structure, both of said shear pin means being constructed to fracture when an axial force is exerted on one of said shaft pieces.

8. A steering mechanism for a motor vehicle comprising vehicle support structure, a steering gear mounted forwardly on said structure and constructed to be connected to a steering linkage, a steering column connected to said support structure, a steering shaft assembly rotatably supported by said column, said shaft assembly being connected to a steering wheel at its rearward end and to said steering gear at its forward end, said shaft assembly comprising first steering shaft piece, second steering shaft piece and a flexible coupling interconnecting said pieces and forming a driving connection therebetween, said flexible coupling having a first coupling element, a second coupling element and an intermediate flexible member connected to said first and second elements, said first coupling element having a recess constructed to receive the end of said first shaft piece, said recess being open on one side thereof, said first coupling element having a sloping surface at the end of said recess, said first shaft piece having a sloping end surface complementing the sloping surface of said recess, first shear pin means connecting said first coupling element to said first shaft piece, a recess formed in said second coupling element, said just mentioned recess having a sloping end wall and one open side, said second shaft piece being constructed to fit into said recess of said second coupling element and having a sloping end surface constructed to complement the sloping surface of said recess, second shear pin means connecting said second shaft piece to said second coupling element, reaction means secured to said shaft assembly rearwardly of said flexible coupling and constructed to engage a member stationary with said support structure, said shear pin means being constructed to fracture when an axial force is exerted thereon and thereby permitting said shaft pieces to become displaced from said flexible coupling and from each other.

9. A steering shaft assembly for a motor vehicle comprising a first steering shaft piece connected to a steering wheel and a second steering shaft piece connected to a steering gear, a flexible coupling interconnecting said pieces and forming a driving connection therebetween, said flexible coupling having a first coupling element, a second coupling element and an intermediate flexible member connected to said first and second coupling elements, first shear pin means connecting said first coupling element to said first shaft piece, second shear pin means connecting said second shaft piece to said second coupling element, stationary support means constructed to rotatably support said first steering shaft piece, said support means also being adapted to coact with means on said first steering shaft piece to prevent axial displacement thereof in a rearward direction, said shear pin means being constructed to fracture when a force is exerted thereon and thereby permitting said shaft pieces to become displaced from said flexible coupling and from each other.

References Cited

UNITED STATES PATENTS

| | | | |
|---|---|---|---|
| 2,548,244 | 4/1951 | Stein | 74—492 |
| 3,329,040 | 7/1967 | Stein | 74—492 X |
| 3,373,629 | 3/1968 | Wight et al. | 74—492 |

FOREIGN PATENTS 567,772  12/1923  France.

MILTON KAUFMAN, Primary Examiner

U.S. Cl. X.R.
180—78; 280—87